US012600212B2

(12) United States Patent
Blottiau et al.

(10) Patent No.: US 12,600,212 B2
(45) Date of Patent: Apr. 14, 2026

(54) HIDDEN FRAMED DOOR FOR A MOTOR VEHICLE

(71) Applicant: HUTCHINSON, Paris (FR)

(72) Inventors: Olivier Blottiau, Amilly (FR); Cyril Lajoux, Vimory (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 18/990,586

(22) Filed: Dec. 20, 2024

(65) Prior Publication Data

US 2025/0206108 A1     Jun. 26, 2025

(30) Foreign Application Priority Data

Dec. 22, 2023    (FR) ...................................... 2315180

(51) Int. Cl.
B60J 10/79          (2016.01)
B60J 5/04           (2006.01)
B60J 10/32          (2016.01)

(52) U.S. Cl.
CPC ............. B60J 10/79 (2016.02); B60J 5/0402 (2013.01); B60J 10/32 (2016.02)

(58) Field of Classification Search
CPC ....................................................... B60J 10/79
See application file for complete search history.

(56) References Cited

U.S. PATENT DOCUMENTS 4,483,100 A * 11/1984 Blankenburg ........... B60J 10/24
                                                        49/374
4,490,942 A * 1/1985 Arnheim ................... B60J 10/24
                                                        49/440
4,509,293 A * 4/1985 Ufrecht .................... B60J 10/79
                                                        49/374
4,581,851 A * 4/1986 Warner .................... B60J 10/76
                                                        49/374
4,604,830 A * 8/1986 Maeda ..................... B60J 10/30
                                                        49/440
4,608,779 A * 9/1986 Maeda ..................... B60J 10/32
                                                        49/440
4,794,734 A * 1/1989 Stempien ............... B60J 5/0416
                                                        49/374

(Continued)

FOREIGN PATENT DOCUMENTS

DE      102019213427 A1 * 3/2021    ........... B60J 5/0402
EP          0021069 B1   10/1982
FR          2543074 A1 * 9/1984    .............. B60J 10/30

OTHER PUBLICATIONS

French Search Report for French Application No. FR2315180, dated Jun. 12, 2024, 2 pages.

*Primary Examiner* — Catherine A Kelly
(74) *Attorney, Agent, or Firm* — Dickinson Wright PLLC

(57)          ABSTRACT

A hidden framed door for a vehicle, in particular a motor vehicle, is disclosed. The door comprises a framework comprising a lower box and an upper peripheral frame which includes a vertical post; a movable window, part of the interior face of which completely covers the vertical post and part of the peripheral edge of which extends along this post when the window is in its upper position; a window guide fixed to the interior face of the window and extending along this part of the peripheral edge; and a slide, a part of which is fixed to the vertical post and can cooperate with the window guide to guide the window as it moves.

20 Claims, 11 Drawing Sheets

(56) References Cited

U.S. PATENT DOCUMENTS

| | | | | | |
|---|---|---|---|---|---|
| 4,874,201 | A | * | 10/1989 | Scaglietti | B60J 10/78 49/374 |
| 4,875,307 | A | * | 10/1989 | Barbero | B60J 10/79 49/440 |
| 4,984,389 | A | * | 1/1991 | Benoit | B60J 5/0463 49/377 |
| 5,040,333 | A | * | 8/1991 | Mesnel | B60J 10/24 49/440 |
| 5,154,028 | A | * | 10/1992 | Hill | B60J 10/777 296/93 |
| 5,219,382 | A | * | 6/1993 | Backes | B60J 10/84 49/492.1 |
| 5,319,883 | A | * | 6/1994 | Gueneau | B60J 10/79 49/489.1 |
| 5,699,603 | A | * | 12/1997 | Backes | B60J 10/18 264/238 |
| 5,732,509 | A | * | 3/1998 | Buehler | B60J 10/75 49/440 |
| 6,141,910 | A | * | 11/2000 | Kobrehel | B60J 10/248 49/374 |
| 8,701,349 | B2 | * | 4/2014 | Krause | B60J 10/79 49/374 |
| 9,944,159 | B2 | * | 4/2018 | Dosaki | B60J 10/16 |
| 10,167,659 | B2 | * | 1/2019 | Sagisaka | E05D 15/165 |
| 11,279,209 | B2 | * | 3/2022 | Ishiguro | B60J 1/17 |
| 11,299,019 | B2 | * | 4/2022 | Veille | B60J 1/17 |
| 11,639,086 | B2 | * | 5/2023 | Blottiau | B60J 10/265 49/459 |
| 11,697,334 | B2 | * | 7/2023 | Choi | B60J 10/79 296/146.2 |
| 12,179,562 | B2 | * | 12/2024 | Baratin | B60R 13/04 |
| 12,251,993 | B2 | * | 3/2025 | Kunz Arrache | B60J 10/79 |
| 2012/0025564 | A1 | * | 2/2012 | Ellis | B60J 10/79 296/146.9 |
| 2020/0130488 | A1 | * | 4/2020 | Choi | B60J 10/45 |
| 2020/0180405 | A1 | * | 6/2020 | Blottiau | B60J 10/265 |
| 2022/0355654 | A1 | * | 11/2022 | Baratin | B60R 13/0243 |
| 2025/0135854 | A1 | * | 5/2025 | Roeser | B62D 25/04 |

* cited by examiner

HIDDEN FRAMED DOOR FOR A MOTOR VEHICLE

CROSS-REFERENCE TO RELATED APPLICATION(S)

This present application claims priority to French Patent Application No. 2315180, filed Dec. 22, 2023, the disclosure of which is hereby incorporated by reference in its entirety.

TECHNICAL FIELD

The disclosure relates to a hidden framed door for a vehicle, in particular a motor vehicle, and to a vehicle, in particular a motor vehicle, comprising such a door.

BACKGROUND

Generally speaking, a vehicle door comprises a framework including a lower box, and a window which is movable from a lower position in which it is at least partly housed in the lower box, and an upper position in which it is mainly located above the box.

In the field of vehicles, especially motor vehicles, there are three types of doors.

According to a first type of door, the framework of the door comprises an upper peripheral frame which is intended to surround the window when it is in its upper position. This frame generally comprises two vertical posts connected by an upper crossbar, the vertical posts extending between the box and the upper crossbar. A door of this first type is called a "(visible) framed door".

In the field of motor vehicles, a "flush" appearance is considered to be an aesthetic one. This aspect is obtained by aligning two outer or exterior faces (visible to a user outside the vehicle) of two adjacent elements (bodywork and/or window), without any intermediate part being inserted between these faces. This ensures the continuity of these faces, giving the visual impression of a smooth, aerodynamic surface.

The first type of door, with a visible frame, is very widespread, but its disadvantage is that it is not possible to achieve a "flush" effect with this type of door, because of its frame.

According to a second type of door, the framework of the door does not comprise an upper peripheral frame. A door of this second type is called a "frameless door". The advantage of this type of door is that it is possible to obtain a "flush" effect, for example with a trim adjacent to the window when it is in the upper position.

According to a third type of door, the framework comprises an upper peripheral frame, but this frame is intended to be hidden. The frame can be hidden by the window, by trims or by the slide. The frame, for example, is hidden by the window in its upper position. The window comprises an exterior face directed towards the exterior of the door and an interior face directed towards the interior of the door, which covers the frame to hide it from users outside the vehicle. A door of this third type is referred to as a "hidden framed (or hidden frame) door" or "hidden framed door with frameless door appearance", and the present application relates to such a door.

One window comprises a peripheral edge, a part of which extends along a vertical post of the frame of the framework. To guide the window as it moves along this vertical post, a window guide is provided on the window and a slide on the vertical post, the window guide slidingly cooperating with the slide.

The window guide is fixed to the interior face of the window and extends along a part of the peripheral edge of the window and the vertical post.

The slide generally extends around the frame, in particular to ensure a seal between the window and the frame in the upper position. A part of the slide is fixed to the vertical post and cooperates with the window guide to guide the window.

The present disclosure offers an improvement to this type of hidden framed door, which in particular makes it easier to assemble the door.

SUMMARY

The present disclosure provides a hidden framed door for a vehicle, in particular a motor vehicle, the door comprising:
  a framework comprising a lower box and an upper peripheral frame which includes a vertical post,
  a movable window, movable from a lower position in which it is at least partly housed in the lower box, and an upper position in which the frame is hidden by the window, the window comprising an exterior face directed towards the exterior of the door, an interior face directed towards the interior of the door, and a peripheral edge, a part of the interior face completely covering the vertical post and part of the peripheral edge extending along this post when the window is in its upper position,
  a window guide fixed to the interior face of the window and extending along this part of the peripheral edge, and
  a slide, a part of which is fixed to the vertical post and can cooperate with the window guide to guide the window as it moves, characterised in that the slide is formed in a single piece and comprises sealing lips and a fixing clamp on the vertical post, this clamp having an elongated shape along the vertical post and having a U-shaped cross-section, the opening of which is directed towards the interior of the door.

The characteristics of the slide allow easy installation and assembly of the door as a whole. In fact, the slide is in one piece and is mounted on the vertical post by means of its clamp, engaging it on the vertical post by translating it towards the interior of the door. This simple operation can be carried out by an operator without any special tools, for example.

The door according to the disclosure may comprise one or more of the following characteristics, considered independently of one another or in combination with one another:
  the vertical post is a vertical post at the rear or front of the frame and door;
  the slide comprises a housing which extends along the vertical post and which receives a part of the window guide, this housing being adjacent to the clamp;
  the clamp comprises two parallel lateral walls which extend along the vertical post and a median wall which connects the lateral walls together and which is parallel to and facing the interior face of the window;
  one of the lateral walls of the clamp is aligned with the aforementioned part of the peripheral edge of the window in a plane perpendicular to the window;
  one of the lateral walls is located on the same side as the window guide and a second of the lateral walls is located on the opposite side to the window guide;

the second lateral wall has an inner face located in the opening of the U and an outer face located in said plane;

the housing is at least partly delimited by a first of said lateral walls and by an extension of said median wall which extends towards the window guide;

the extension extends parallel to the interior face of the window;

the extension comprises a free end opposite the first of the lateral walls, this free end comprising a rim which is oriented towards the interior of the door and which extends along the vertical post;

the extension and/or the median wall comprises a face facing the interior face of the window, which is coated with a flocking and/or a smooth (e.g. slippery) or embossed coating;

the window guide rests on the rim in a direction perpendicular to the window and/or in a direction parallel to the window;

the extension or rim comprises or is connected to a sealing lip which cooperates with the window guide;

a second of said lateral walls comprises or is connected to at least one sealing lip and/or at least one sealing tube;

the flocking or the smooth or embossed coating extends as far as said at least one sealing lip or said at least one sealing tube;

the or each sealing lip or tube extends along the vertical post;

the or one of the sealing lips of the clamp or of the second lateral wall cooperates with the vertical post;

the or one of the sealing lips of the clamp or of the second lateral wall cooperates with the part of the peripheral edge of the window;

clamp comprises a hook which is able to cooperate with a punched hole in the vertical post;

the slide further comprises a leg which extends along the vertical post and which is covered by the interior face of the window, this leg comprising one end connected to the clamp and an opposite end connected to the vertical post or to an interior trim which covers the vertical post;

the leg extends at least partly parallel to the interior face of the window;

the leg is connected to an end of one of the lateral walls of the clamp, which is opposite the end of this lateral wall which is connected to the median wall;

the leg is connected to the first of the lateral walls;

the leg extends at least partly parallel to said rim of the extension;

the housing is at least partly delimited by said leg;

the leg comprises at least one sealing lip which cooperates with the interior face of the window and/or with the window guide, and/or with the vertical post, and/or with an interior trim which covers the vertical post;

the leg comprises a rim which is oriented towards the window and on which the window guide is able to come to bear in a direction parallel to the window;

the rim of the leg is at least partly parallel to one of the lateral walls or to the lateral walls of the clamp;

the clamp is made of a harder material than the leg, the clamp being made of polypropylene (PP) for example;

the sealing lips are made of a softer material than the clamp;

the clamp comprises an inner armature;

the armature of the clamp extends into the extension; and the sealing lips rest on the interior face of the window, and/or the window guide, and/or the vertical post, and/or said part of the peripheral edge, and/or trim.

The disclosure also relates to a vehicle, in particular a motor vehicle, comprising a door as described above and a centre pillar which extends along the vertical post when the door is closed, the exterior face of the window being aligned with an exterior face of another element adjacent to said part of the peripheral edge of the window.

The element is preferably an exterior trim or a fixed window that covers at least part of the centre pillar. Alternatively, the element is a window that forms part of another door of the vehicle.

BRIEF DESCRIPTION OF THE DRAWINGS

The disclosure will be better understood and other details, characteristics and advantages of the present disclosure will become clearer from the following description made by way of non-limiting example and with reference to the attached drawings, in which.

DETAILED DESCRIPTION

Figure 1:
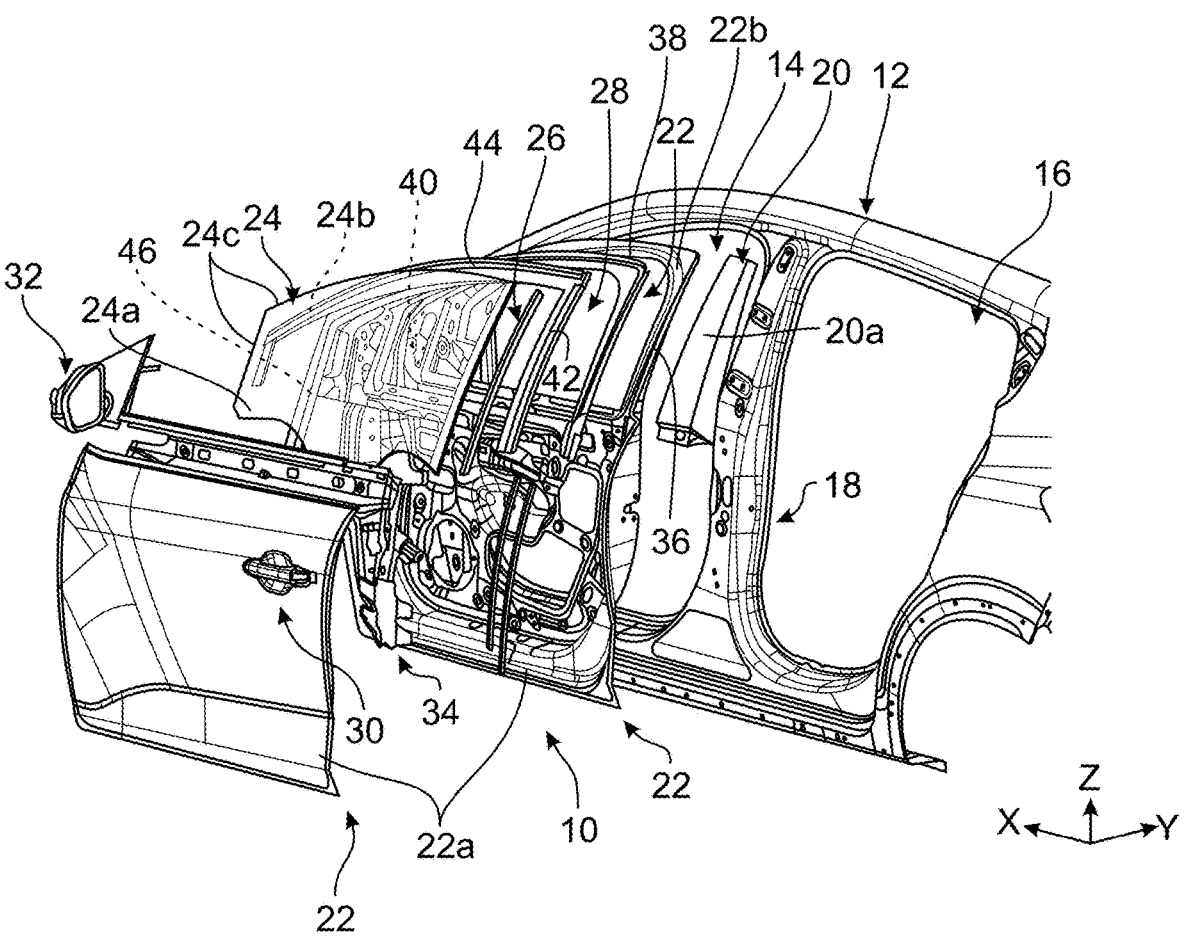
FIG. 1 is a schematic exploded perspective view of a hidden framed door according to the disclosure.
Figure 2:
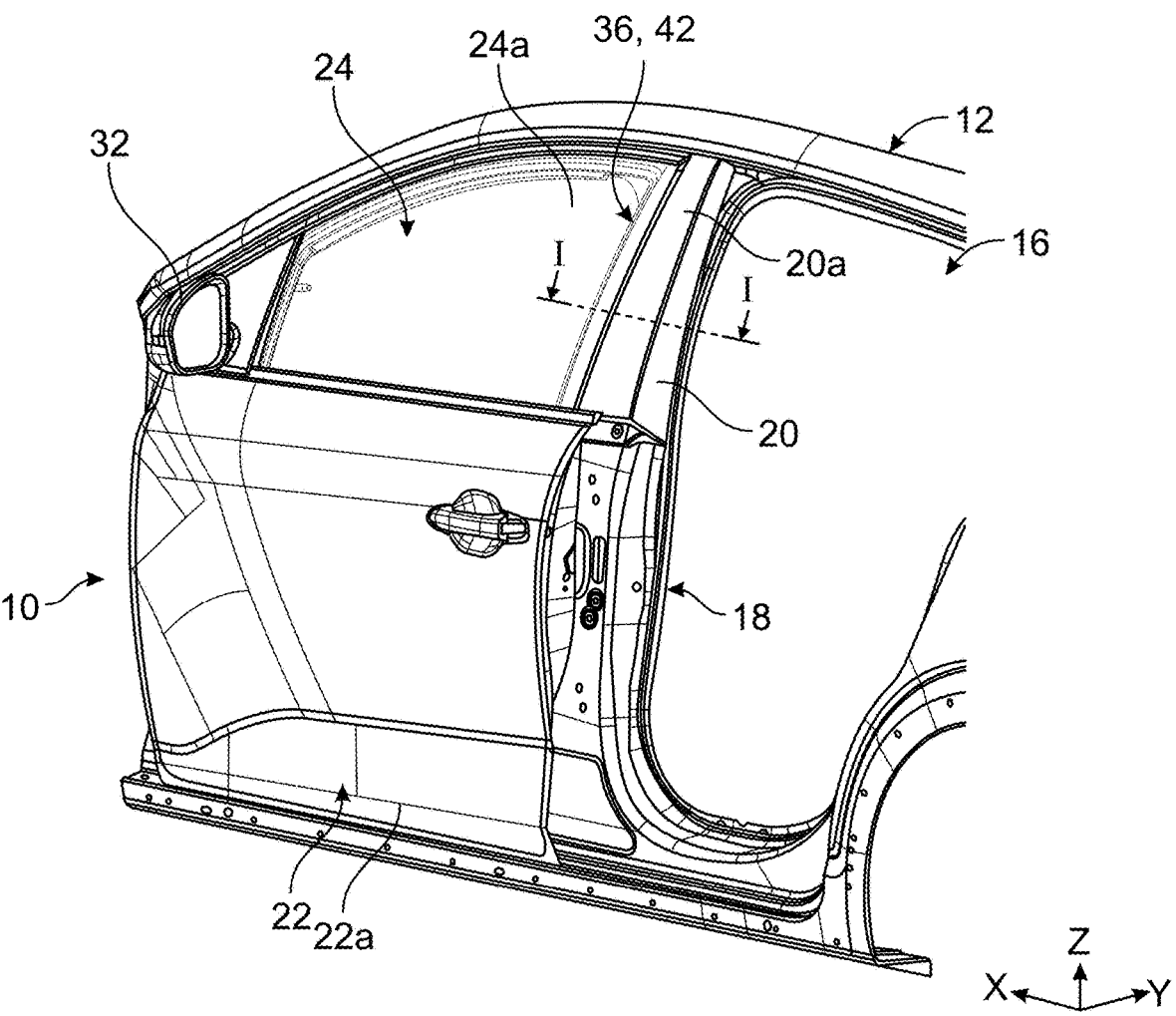
FIG. 2 is an assembled schematic perspective view of the hidden framed door of FIG. 1.

FIGS. 1 and 2 show a hidden framed door 10 and a part of a vehicle, in particular a motor vehicle, on which this door 10 is mounted.

In this case, the vehicle part is a structure 12 intended to be located on a left-hand side of the vehicle and comprising housings 14, 16 for mounting doors. One of the housings 14 is a housing of the door 10 which is a front door in the example shown, and the other of the housings 16 is a housing of a rear door which is not shown in the drawings.

The two housings 14, 16 are separated by a column of the structure 12, which is substantially vertical and is referred to as the "centre pillar" 18.

It is understood that the doors are hinged to the structure 12 so that they can be opened and closed to allow access to users entering the vehicle through the housings 14, 16.

In this application, the interior is distinguished from the exterior of the vehicle and an interior direction or orientation, oriented towards the interior of the vehicle, is also distinguished from an exterior direction or orientation, oriented to the exterior of the vehicle.

In the orthogonal benchmark XYX, the X axis is oriented in the longitudinal direction of the vehicle from rear to front. The Y axis is oriented towards the interior of the vehicle and the Z axis is oriented upwards. The centre pillar 18 extends along the Z axis and can be parallel to this axis.

To improve the aesthetics of the vehicle, it is known to fit trims that are visible from the exterior of the vehicle. This is particularly the case for the trim 20, which is mounted on at least an upper part of the centre pillar 18 and covers this centre pillar on the side exterior the vehicle. The trim 20 is attached to the centre pillar by appropriate means. The trim 20 has an exterior face 20a that is visible from exterior the vehicle.

The trim 20 can be made up of one or more pieces.

Concerning the door 10, it comprises:

a framework 22, a movable window 24, a window guide 26, and a slide 28.

The door 10 may include other elements such as a handle 30, a rear-view mirror 32, a window drive system 34, which are visible in the drawings, but also other elements which are not necessarily visible, such as a trim, etc.

The framework 22 can be formed by assembling several pieces. The framework 22 comprises:

a lower box 22a, and an upper peripheral frame 22b.

The frame 22b may be generally L-, V- or U-shaped and comprise at least a first vertical post 36. The frame 22b may also include an upper crossbar 40 and a second vertical post 38.

The vertical posts 36, 38 extend substantially along the axis Z from the box 22a. The vertical posts 36, 38 can have different lengths along this X axis, as is the case in the example shown.

The crossbar 40 extends substantially along the X axis between the posts 36, 38, and in particular between their ends opposite the box 22a.

In the example shown, the first vertical post 36 is a rear vertical post which is intended to extend along the centre pillar 18 when the door 10 is closed.

The lower box 22a is intended to be located in the lower part of the housing 14 and the frame 22b is intended to extend around the edge of the rest of the housing 14, when the door 10 is closed.

The window 24 is movable from a lower position in which it is at least partly housed in the lower box 22a, and an upper position in which the frame 22b is hidden by the window 24. FIGS. 1 and 2 illustrate this upper position.

The window 24 comprises an exterior face 24a directed towards the exterior of the door 10 and the vehicle, an interior face 24b directed towards the interior of the door 10 and the vehicle, and a peripheral edge 24c which extends all around the window 24 between its faces 24a, 24b.

A part of the interior face 24b of the window 24 completely covers the vertical post 36.

A part of the peripheral edge 24c extends along this post 36 when the window is in its upper position.

The window guide 26 is fixed to the interior face 24b of the window 24 and extends along this part of the peripheral edge 24c.

The slide 28 can cooperate with the window guide 26 to guide the window 24 as it moves.

The slide 28 may be similar in shape to the frame 22b and may be generally L, V or U shaped. The slide 28 may comprise a first substantially vertical part 42 which extends along the vertical post 36 and is secured to the latter.

The slide 28 may also comprise an upper transverse part 44 and a second substantially vertical part 46.

The parts 42, 46 extend substantially along the Z axis. The parts 42, 46 may have different lengths along this Z axis, as is the case in the example shown.

The transverse part 44 extends substantially along the X axis between the parts 42, 46, and in particular between their ends opposite the box 22a. The ends of parts 42, 46 located on the side of box 22a are intended to be housed in this box 22a.

In the example shown, the part 42 of the slide 28 is a rear vertical part which is intended to extend along the vertical post 36 and the centre pillar 18 when the door 10 is closed.

Figure 3:
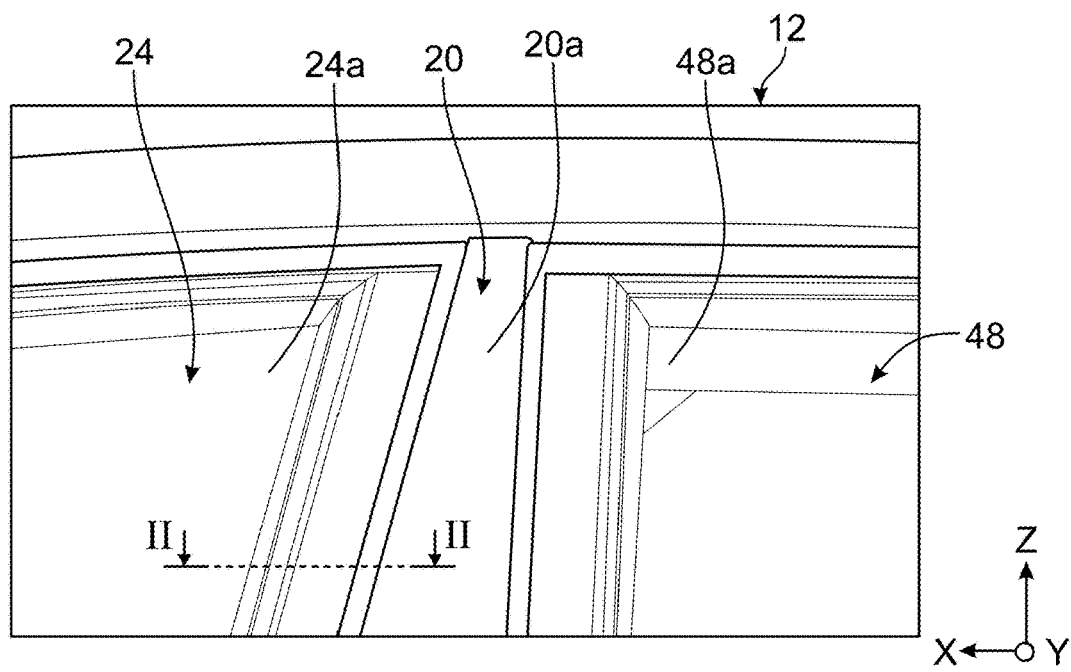
FIG. 3 is a partial schematic view of a vehicle comprising a hidden framed door, the door's window of which is flush with a trim on the centre pillar of the vehicle.

FIG. 3 shows a first example of a flush aspect in which the exterior face 24a of the window 24 is aligned with the exterior face 20a of the trim 20. The figure also shows that these faces 24a, 20a can also be aligned with the exterior face 48a of another window 48. This window 48 is movable, for example, and forms part of the aforementioned door for closing the rear housing 16 of the vehicle.

Figure 4:
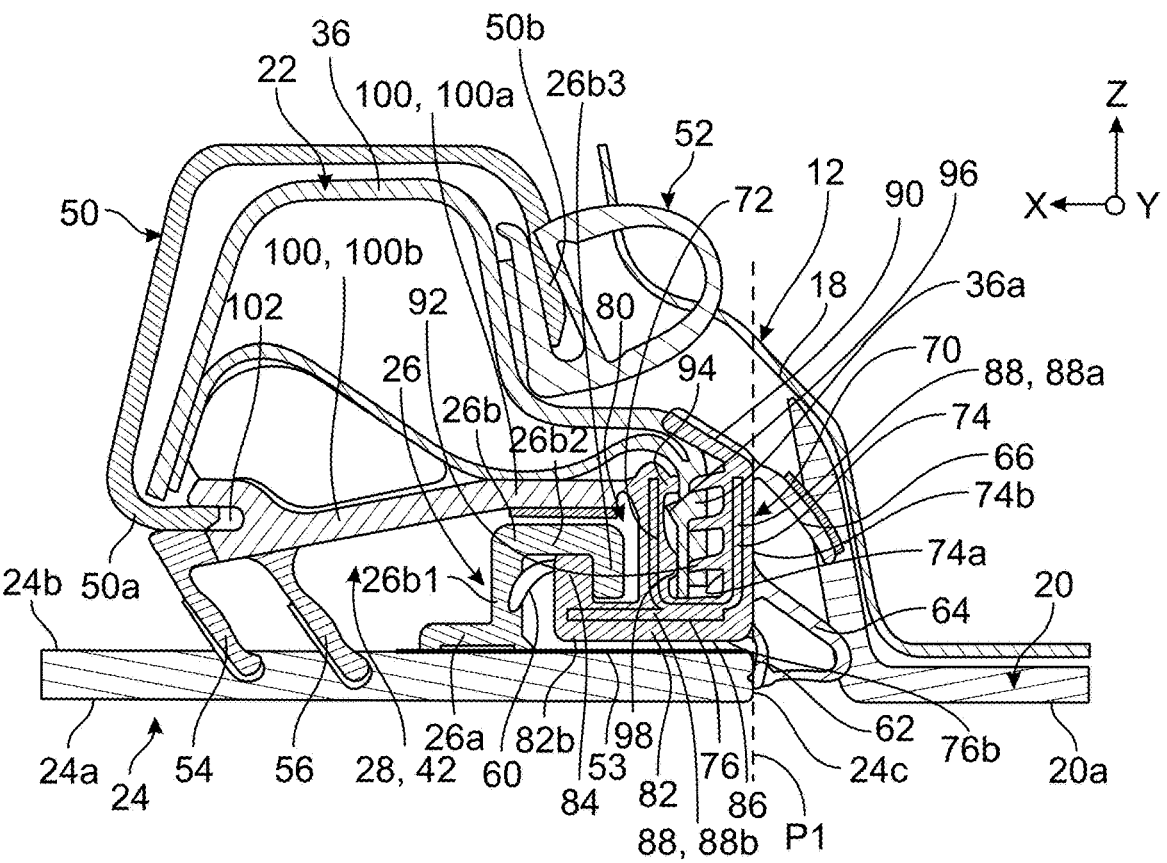
FIG. 4 is a schematic cross-sectional view of a hidden framed door, and shows a first embodiment of the disclosure.

FIG. 4 is a sectional view along line I-I in FIG. 2 or II-II in FIG. 3 and shows the assembly and positioning of the various parts of the door 10, the structure 12 and the trim 20, when the door 10 is in the closed position.

In this figure, the pieces already described above are designated by the same references.

The vertical post 36 may comprise a tab 36a which is directed towards the exterior while being hidden by the window 24, and which also extends substantially parallel to the axis Z. The tab 36a is preferably parallel to the plane ZOY.

In the example shown, the post 36 is covered on the interior by a trim 50 which is therefore visible from interior the vehicle and is intended to improve the aesthetics of the passenger compartment of the vehicle. This trim 50 can take the form of a U or C-shaped cowling which is clipped or hooked onto the post 36. In the example shown, the trim 50 comprises two hooks 50a, 50b for attachment to the post 36, these hooks 50a, 50b extending along two longitudinal edges of the trim 50 which extend along the Z axis. One of these hooks 50a, located on the side opposite the centre pillar 18, is supported on an edge of the post 36, and the other of these hooks 50b is located on the side of the centre pillar 18.

A sealing system such as a sealing tube 52 can be fitted between the post 36 and the centre pillar 18, or between the trim 50 and the centre pillar 18, in particular at this other hook 50b.

A sealing tube is an elongate element, which extends in particular along the Z axis, and which is made of a flexible and deformable material capable of cooperating by bearing with at least one piece in order to provide a seal with this piece. The concept of a tube is linked to the fact that it defines a compressible inner cavity along its axis of elongation.

The window guide 26 is formed in a single piece and generally comprises a base 26a for fixing to the window 24, and a finger 26b for guiding in the slide 28. The base 26a is applied to the interior face 24b of the window 24 and fixed to it, generally by gluing.

The finger 26b projects from the base 26a towards the interior of the vehicle and is generally L- or U-shaped. The finger 26b comprises a first wall 26b1 perpendicular to the window 24, which extends towards the interior from the base 26a, and which is connected to a second wall 26b2 parallel to the window 24 and which extends from the first wall 26b1 towards the aforementioned part of the peripheral edge 24c of the window 24. As in the example shown, the finger 26b may comprise a third wall 26b3 perpendicular to the window 24, which extends towards the exterior from the second wall 26b2. The finger 26b is thus generally U-shaped.

The first wall 26b1 comprises parallel lateral faces. The second wall 26b2 comprises parallel interior and exterior faces respectively. The third wall 26b3 comprises parallel lateral faces.

The interior face 24a of the window 24 can be coated with an opaque or opacifying layer 53 by screen-printing or painting, particularly in the area where the window guide 26 is attached. The base 26a of the window guide 26 can be fixed directly to this layer 53. The layer 53 may extend to the aforementioned part of the peripheral edge 24c.

The slide 28 and in particular its part 42 comprises:

sealing lips 54, 56, 60, 62, 64, 66, and a clamp 70 for fixing to the vertical post 36.

The special characteristic of the slide 28, and in particular of its part 42, is that it is formed from a single piece, preferably by extrusion.

The clamp 70 is elongated along the vertical post 36 and is U-shaped in cross-section, with the opening directed towards the interior of the door 10.

The clamp 70 is configured to be engaged on the tab 36a of the post 36.

The clamp 70 comprises two parallel lateral walls 72, 74 which extend along the vertical post 36 and a median wall 76 which connects the lateral walls 72, 74 together and which is parallel to and facing the interior face 24b of the window 24. The U shape of the clamp 70 is defined by these walls 72, 74, 76.

The walls 72, 74 are parallel to the plane ZOY. The wall 76 is perpendicular to walls 72 and 74 and parallel to the XOZ plane.

The clamp 70 is hidden by the window and the wall 76 is located at a short distance from the window 24. The distance between the wall 76 and the interior face 24b of the window 24 is, for example, less than or equal to 1 cm, and preferably less than or equal to 5 mm.

One of the lateral walls, wall 72, is located on the same side as the window guide 26, and the other of the lateral walls, the wall 74, is located on the opposite side to the window guide 26.

The wall 74 may be aligned with the aforementioned part of the peripheral edge 24c of the window, in a plane P1 perpendicular to the window 24, as in the example shown. More particularly, the wall 74 comprises an inner face 74a located in the opening of the U and an outer face 74b which is located in said plane P1.

The wall 72 comprises an inner face 72a located in the U-shaped opening and an outer face 72b.

The slide 28 comprises a housing 80 which extends along the vertical post 22 and receives a part of the window guide 26, this housing 80 being adjacent to the clamp 26.

The housing 80 is at least partly delimited by the wall 72, and in particular its face 72b, as well as by an extension 82 of the wall 76 which extends towards the window guide 26.

The extension 82 extends parallel to the interior face 24b of the window 24. The distance between the extension 82 and the interior face 24b of the window 24 is equal to the aforementioned distance between the wall 76 and the interior face 24b of the window 24.

The extension 82 comprises a free end 82a opposite the wall 72, this free end 82a comprising a rim 84 which is oriented towards the interior of the door 10 and which extends along the vertical post 36.

Figure 8:
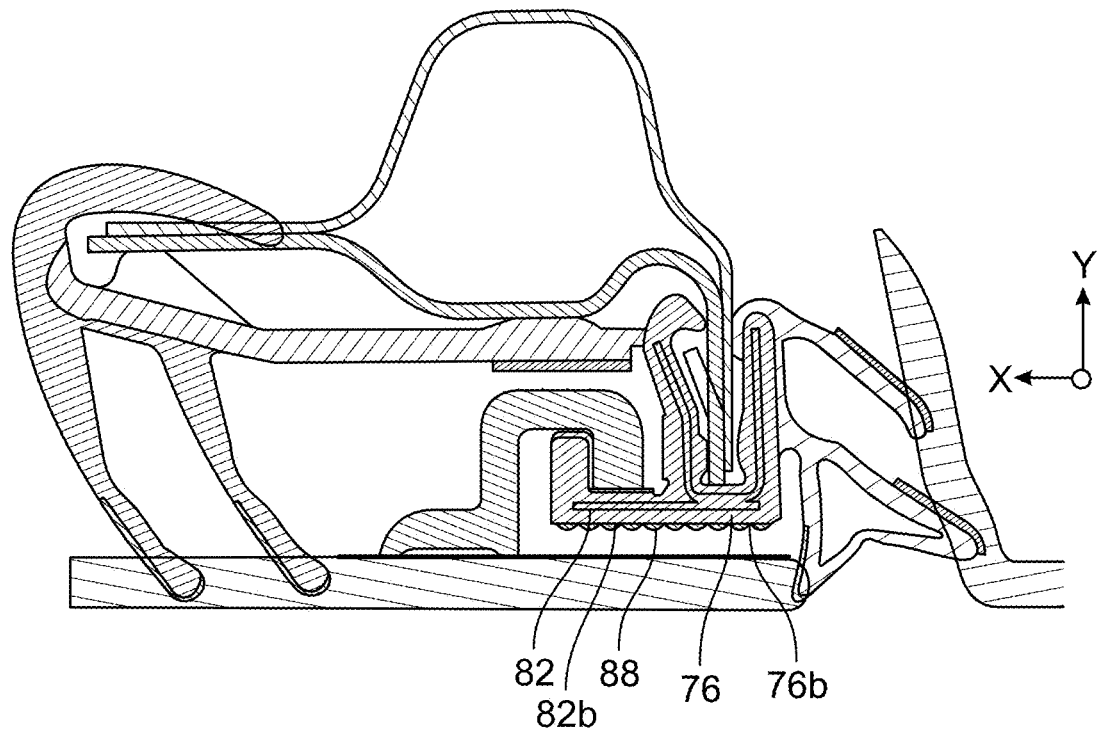
FIG. 8 is a schematic cross-sectional view of a hidden framed door, and shows a fifth embodiment of the disclosure.

The exterior face 82b of the extension 82 and the exterior face 76b of the wall 76 are continuous with each other and face the interior face 24b of the window 24. These faces 82b, 76b may be coated with a flocking 86 and/or a coating which may be smooth or bumpy 88 (FIG. 8).

The rim 84 comprises two side faces parallel to each other and to the plane ZOY, and an interior face extending between these two side faces.

The rim 84 may comprise or carry at least one sealing lip 60 which cooperates by bearing with the window guide 26 and, for example, with one of the side faces of the second wall 26b1.

The window guide 26 can cooperate with the slide 28 to guide the window 24 as it moves. This guidance is provided by pressing and sliding the window guide 26 on the slide 28 and in particular on its rim 84 in the example shown. The window guide 26 rests on the rim 84 in a direction perpendicular to the window 24 (i.e. parallel to the plane ZOY) and/or in a direction parallel to the window 24 (i.e. parallel to the plane ZOX).

In the example shown, one of the side faces of the wall 26b3 of the window guide 26 bears along the axis X against one of the side faces of the rim 84, and the exterior face of the wall 26b2 of the window guide 26 bears along the Y axis against the interior face of the rim 84 or interior face of the leg 100, which will be described in more detail below.

In the example shown, the clamp 70 is reinforced and therefore comprises an inner armature 88, which may be a metal core. This armature 88 preferably extends into the walls 72, 74, 76 of the clamp 70 and into the extension 82. The armature 88 extends along the post 36 over the entire length of the slide 28 and in particular its part 42. The armature 88 may comprise a first U-shaped part 88a located in the walls 72, 74, 76 of the clamp 70, and another flat portion 88b extending from the wall 76 into the extension 88. The parts 88a, 88b are integral with each other and, for example, welded together.

The clamp 70 comprises or carries sealing lips or tubes 62, 64, 66, 90, 92.

The lips or tubes 62, 64, 66, 90 are located outside the clamp 70 and cooperate, for example, with the edge 24c of the window, and/or the trim 20, and/or the centre pillar 18, and/or the post 36, and/or a peripheral edge of the rear door window.

The lip 62 extends, for example, from the connection between the walls 74, 76 and cooperates with the edge 24c of the window 24. The lip 64 extends, for example, from the wall 74 and cooperates with the trim 20. In the example shown, the lips 62, 64 meet to form a sealing tube.

The lip 66 extends, for example, from the end of the wall 74 opposite the wall 76, and also cooperates with the trim 20. The lip 66 extends, for example, from the end of the wall 74 opposite the wall 76, and also cooperates with the post 36.

The lips 92 are located inside the clamp 70 and extend from the inner faces of the walls 72, 74 to cooperate with the tab 36*a*. One of the walls, the wall 72 in the example shown, preferably comprises a hook 94 directed towards the opposite wall 74. This hook 94 is designed to cooperate with a punched hole 96 in the tab 36*a* to improve fixing and in particular anchoring of the slide 28 to the post 36.

The tab 36*a* rests along the Y axis on the interior face of the wall 76 and/or along the X axis on the inner face of the wall 72 or on an inner boss 98 of the latter.

In the example shown, the slide 28 also comprises a leg 100 which extends along the vertical post 36 and is covered by the interior face 24*b* of the window 24.

The leg 100 comprises one end 100*a* connected to the clamp 70 and an opposite end 100*b* which is connected to the vertical post 36 and/or the trim 50.

The leg 100 extends at least partly parallel to the window 24 and its interior face 24*b*.

More specifically, the leg 100 essentially comprises two adjacent parts, namely a part 100*a* located on the side of the clamp 70 and a part 100*b* located on the opposite side.

The part 100*a* is parallel to the window 24 and its interior face 24*b* and defines at least a part of the housing 80. The part 100 is parallel to the extension 82 and extends at a distance along the Y axis from the rim 84 which is defined so that the window guide 26 can be mounted and slid into the housing 80. The face of this part 100*a* directed towards the exterior and towards the window guide 26 may be coated with a flock. The face of this part 100*a* directed towards the interior can be supported along the Y axis on the post 36.

The leg 100 and in particular its part 100*a* is connected to the clamp 70 at the free end of its wall 72, opposite the wall 76. The connection between the leg 100 and the clamp 70 is preferably thinned and therefore comprises a thinning of its thickness along the Y axis.

The leg 100 and in particular its part 100*b* comprises, on the side opposite the clamp 70, a notch 102 in which the hook 50*a* of the trim 50 engages. This notch 102 opens out, for example, in a direction parallel to the X axis and on the opposite side to the clamp 70.

The part 100*b* of the leg 100 may be slightly inclined with respect to the part 100*a* and may comprise sealing lips 54, 56 which cooperate by bearing with the interior face 24*b* of the window 24 and/or the window guide 26, for example at its base 26*a*.

The sealing lips 54, 56, but also at least some of the sealing lips 60, 62, 64, 66, 90, 92 are made of a softer material than the clamp 70, and/or the leg 100.

When assembling the door 10, the slide 28 can be pre-assembled on the window 24 by engaging the window guide 26 in the housing 82 of the slide 28. The assembly is mounted on the framework 22 of the door 10, then the clamp 70 is mounted on the tab 36*a* by exerting an inward force on the window 24 in a direction along the Y axis, until the hook 94 of the clamp 70 engages or co-operates with the punched hole 96 of the tab 36*a*. The trim 50 is assembled at a later stage once the slide 28 is in its final position. The hook 50*a* of the trim 50 is then engaged in the notch 102 in the slide 28 and, if necessary, in a housing of the tube 52.

FIGS. 5 to 9 illustrate alternative versions of the door 10.

The following description focuses on the differences between these variants and the embodiment shown in FIG.

4. The description of FIG. 4 can therefore be considered to apply to FIGS. 5 to 9 insofar as it does not contradict what follows.

In FIGS. 5 to 9, the trim 50 is absent or not shown.

The leg 100 and in particular its part 100*b* comprises, on the side opposite the clamp 70, a boss 104 for bearing on the post 36, the bearing being made towards the interior along the Y axis. The leg 100, and in particular its part 100*b*, also comprises a fixing and sealing lip 106 which extends from the free end of the leg 100, opposite the clamp 70, and which is curved in the direction of the clamp 70 in order to bear on the post 36, the bearing being effected towards the exterior along the Y axis.

The drawings show that the post 36 comprises a second tab 36*b* which is oriented in the X axis towards the opposite side to the tab 36*a*, and which is interposed between the boss 104 and the lip 106.

In FIGS. 5 to 9, it can also be seen that the wall 72 of the clamp 70 comprises an exterior portion 72*x*, connected to the wall 72, which is perpendicular to the wall 76 and to the window 24, and an interior portion 72*y* which extends from the exterior part 72*x* towards the interior and which is inclined to increase the transverse dimension of the opening of the U of the clamp 70 at the free ends of the walls 72, 74. The hook 94 is located at the free end of this inclined interior part 72*y*.

FIGS. 5 to 9 also show that the wall 74 is at a distance from the plane P1 passing through part of the peripheral edge 24*c* of the window 24. The distance between the outer face of wall 74 and plane P1 is preferably less than or equal to 1 cm, and for example less than or equal to 5 mm, this distance being measured along the X axis.

Figure 5:
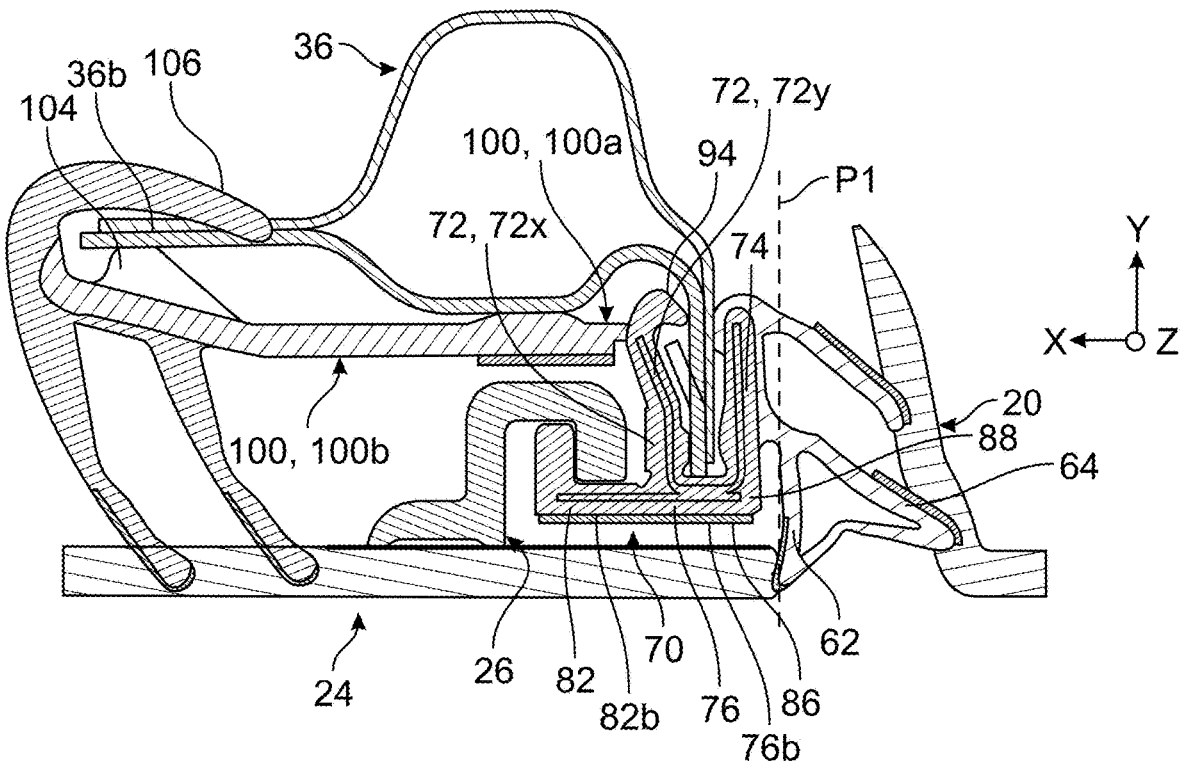
FIG. 5 is a schematic cross-sectional view of a hidden framed door, and shows a second embodiment of the disclosure.
Figure 6:
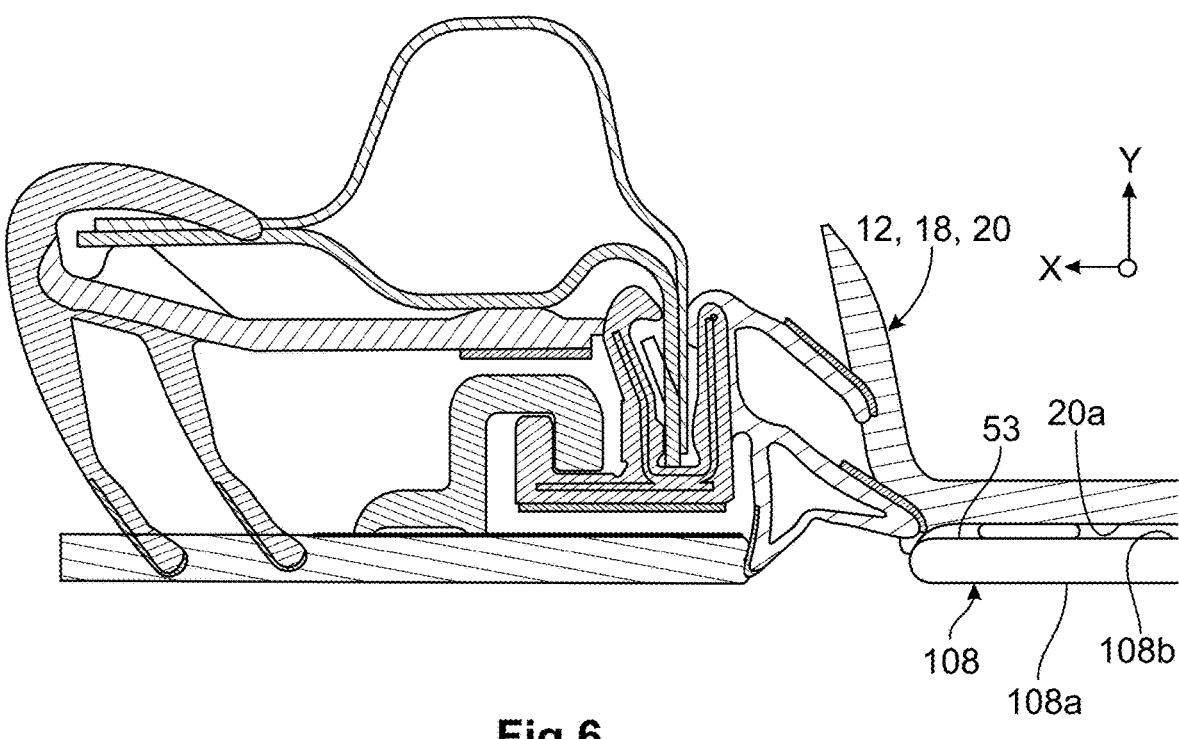
FIG. 6 is a schematic cross-sectional view of a hidden framed door, and shows a third embodiment of the disclosure.

The variant shown in FIG. 6 differs from that shown in FIG. 5 in that the trim 20 carries, on its exterior face 20*a*, a fixed window 108 whose exterior face 108*a* is aligned and therefore flush with the exterior face 24*a* of the window 24. The window 108 can be glued to the trim 20, for example. Preferably, the window 108 is coated on its interior face 108*b* with a shielding layer 53 such as silk-screen printing or paint, so as to mask the trim 20.

Figure 10:
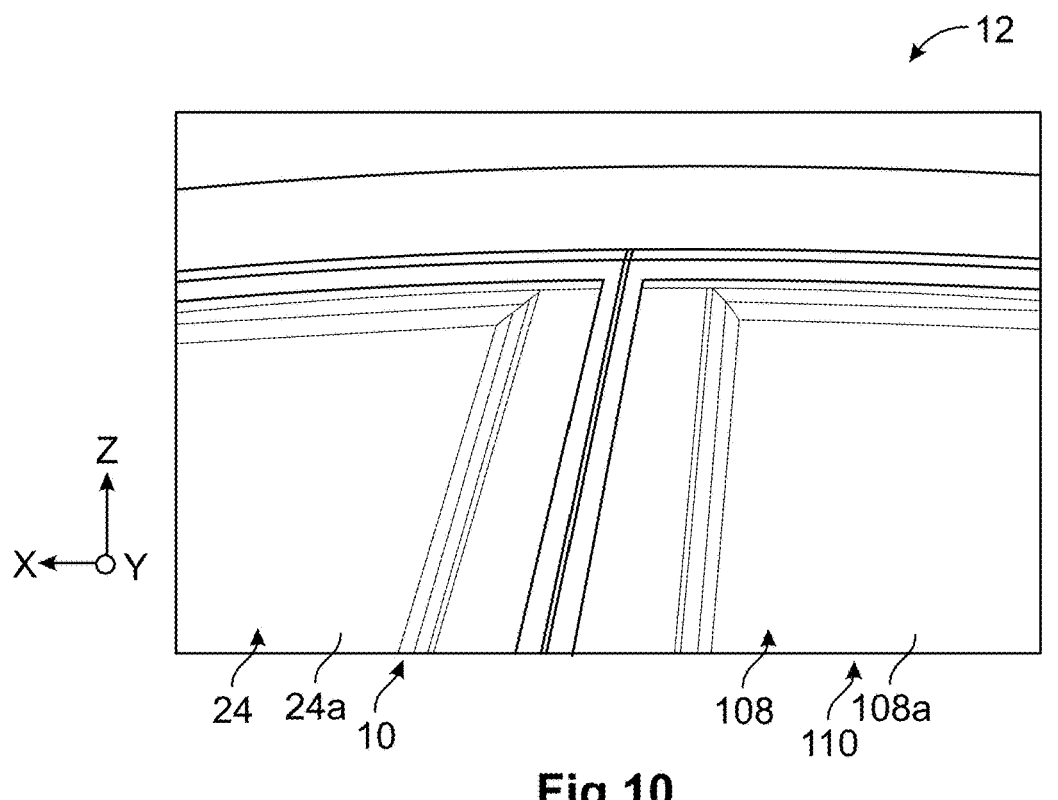
FIG. 10 is a partial schematic view of a vehicle comprising a hidden framed door, the door's window of which is flush with another window of the vehicle.

Alternatively, the window 108 could be fixed directly to the centre pillar 18 of the structure 12 or could form part of a rear door 110 of the vehicle, as shown in FIG. 10. In this case, the portion of the window shielded by the paint/screen printing 18 is limited to a width that allows it to mask the area opposite the centre pillar 18 and the frame of the rear door 110.

Alternatively, the window 108 could be attached directly to the centre pillar 18.

Figure 7:
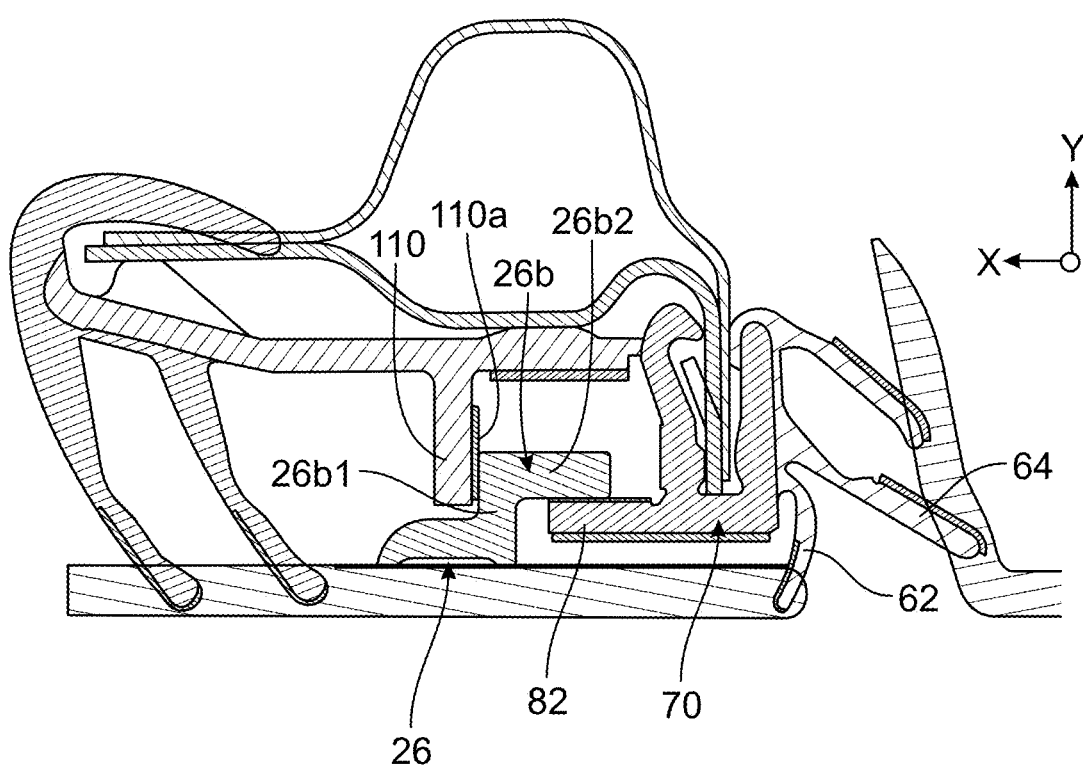
FIG. 7 is a schematic cross-sectional view of a hidden framed door, and shows a fourth embodiment of the disclosure.

The variant shown in FIG. 7 illustrates some differences from the variants shown in FIGS. 4 and 5.

The first difference concerns the window guide 26. The finger 26 of the window guide 26 comprises walls 26*b*1, 26*b*2 but does not comprise a wall 26*b*3. The finger 26 is therefore generally L-shaped rather than U-shaped.

Another difference concerns the extension 82 of the clamp 70, which does not include a rim 84. The wall 26*b*2 of the window guide 26 rests on the interior face of the extension 82, towards the exterior along the Y axis.

In addition, the leg 100 comprises a rim 110 which is oriented towards the window 24 and on which the window guide 26 is able to come to rest in a direction parallel to the window 24.

The rim 110 extends towards the exterior from the leg 100 in a ZOY plane. The rim has two lateral faces, one of which is directed towards the clamp 70 and partly defines the housing 80 for the window guide 26. The inner lateral surface 110*a* of this rim 110, which opens into the housing 80, may comprise a flocking.

The side face of the wall 26*b*1 of the window guide 26, opposite the clamp 70, rests on the rim 110 and in particular on its face 110*a* or its flocking, along the X axis.

Furthermore, as can also be seen in FIG. 7, the clamp 70 may not be reinforced but instead made of a harder material than the rest of the slide 28, and in particular its leg 100. The clamp 70 with its extension 82 is made of polypropylene (PP), for example.

The variant in FIG. 8 differs from that in FIG. 5 in that the exterior face 82*b* of the extension 82 and the exterior face 76*b* of the wall 76 are coated with a flocking 86 in FIG. 5 and with a bumpy coating 88 in FIG. 8.

Figure 9:
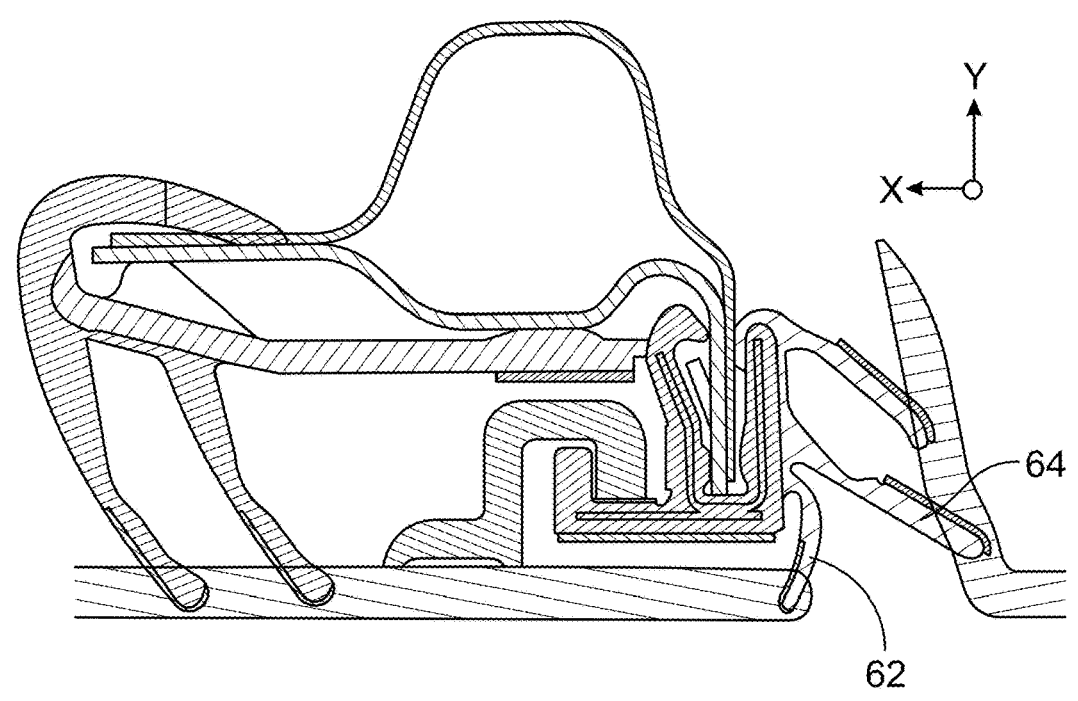
FIG. 9 is a schematic cross-sectional view of a hidden framed door, and shows a sixth embodiment of the disclosure.

The variant in FIG. 9 differs from that in FIG. 5 in that the lips 62, 64 meet in FIG. 5 to form a sealing tube, and remain independent in FIG. 8. This is also the case for the lips 62, 64 in FIG. 7, which are independent of each other.

Figure 11A:
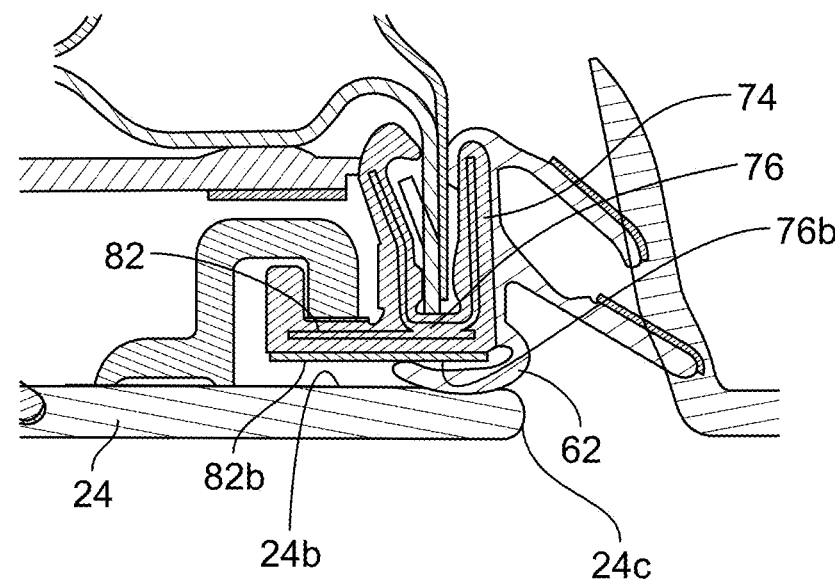
FIGS. 11A and 11B are schematic cross-sectional views of hidden framed doors, and show other embodiments of the disclosure.
Figure 11B:
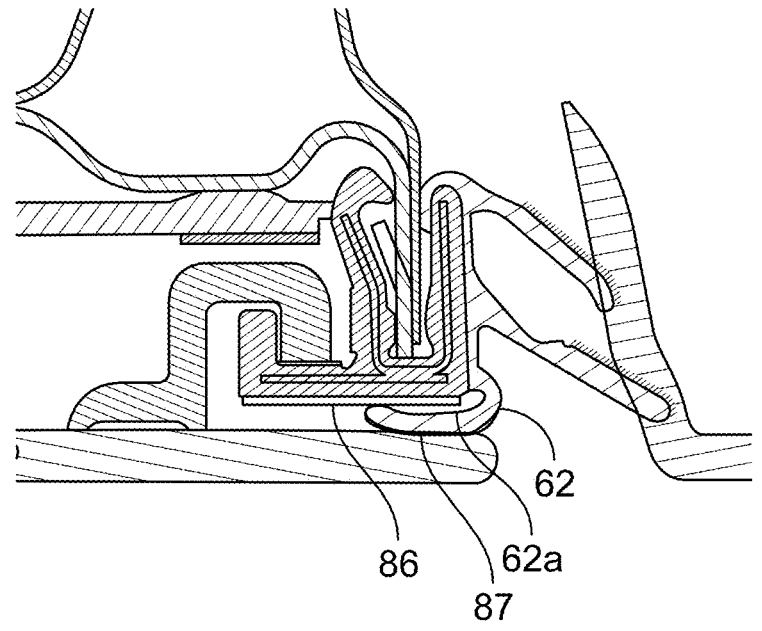

FIGS. 11A-11B and following illustrate other variants of the disclosure.

In FIGS. 11A and 11B, the lip 62 extends, for example, from the connection between the walls 74, 76 and does not cooperate with the edge 24*c* of the window 24. Instead, it is inserted between the exterior face 82*b* of the extension 82 and/or the exterior face 76*b* of the wall 76, on the one hand, and the interior face 24*b* of the window 24, on the other. The lip 62 is in contact with both the exterior face 82*b* of the extension 82 and/or the exterior face 76*b* of the wall 76, on the one hand, and the interior face 24*b* of the window 24, on the other. The lip 62 may have a generally curved shape.

Furthermore, in FIG. 11B, the lip 62 is coated, on the side directed towards the window 24, with a flocking 87 and/or a coating which may be smooth or bumpy, and which may be identical to or different from the flocking 86 and/or the aforementioned coating. The lip 62 is thus in contact with the interior face 24*b* of the window 24 via the flocking 87 or the coating.

Figure 12A:
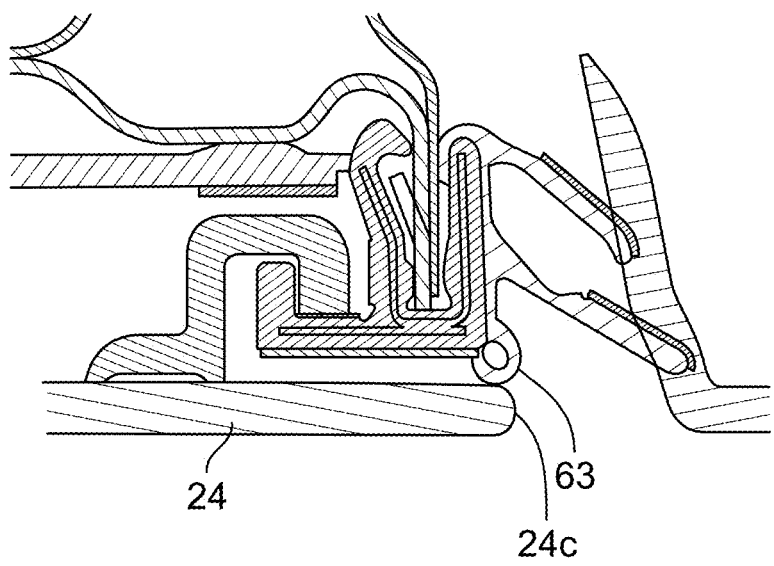
FIGS. 12A and 12B are schematic cross-sectional views of hidden framed doors, and show other embodiments of the disclosure.
Figure 12B:
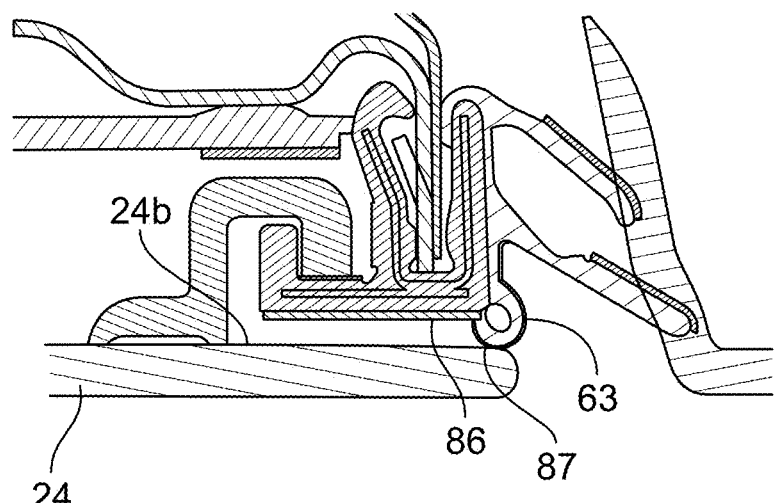

In FIGS. 12A and 12B, the lip 62 is replaced by a sealing tube 63 which, for example, has a generally cylindrical shape. The tube 63 may, for example, comprise a side aligned with the edge 24*c* of the window 24, as in the example shown.

Furthermore, in FIG. 12B, the tube 62 is coated, on the side directed towards the window 24, with a flocking 87 and/or a coating which may be smooth or bumpy, and which may be identical to or different from the above-mentioned flocking 86 and/or coating. The tube 63 is thus in contact with the interior face 24*b* of the window 24 via the flocking 87 or coating. The flocking 87 or the coating of the tube 63 may extend in continuity (without interruption) with the flocking 86 or the aforementioned coating.

Figure 13A:
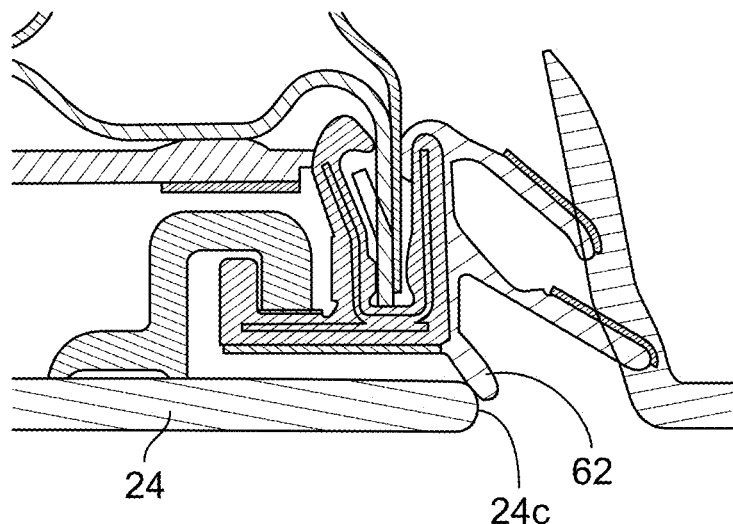
FIGS. 13A and 13B are schematic cross-sectional views of hidden framed doors, and show other embodiments of the disclosure.
Figure 13B:
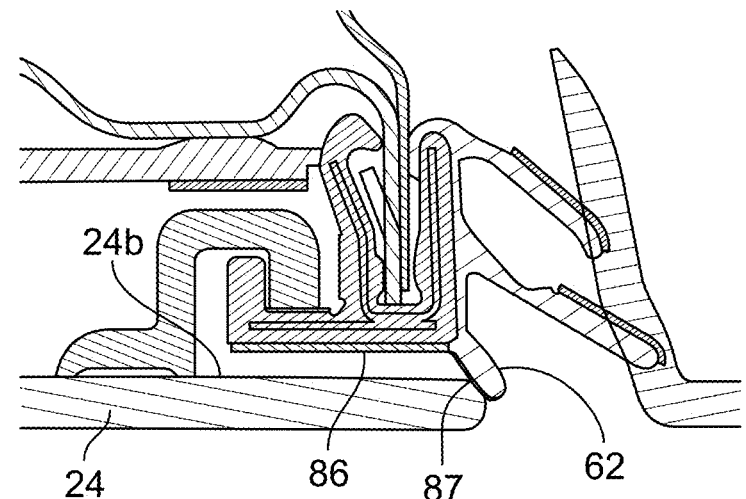

In FIGS. 13A and 13B, the lip 62 is shorter than in FIGS. 11A and 11B and rests on the edge 24*c* of the window 24.

Furthermore, in FIG. 13B, the lip 62 is coated, on the side directed towards the window 24, with a flocking 87 and/or a coating which may be smooth or bumpy, and which may be identical to or different from the flocking 86 and/or the aforementioned coating. The lip 64 is thus in contact with the edge 24*c* of the window 24 via the flocking 87 or the coating. The flocking 87 or the coating of the tube 63 may extend in continuity (without interruption) with the flocking 86 or the aforementioned coating.

What is claimed is:

1. A hidden framed door for a vehicle, the door comprising:

a framework comprising a lower box and an upper peripheral frame which includes a vertical post;

a movable window, movable from a lower position in which the movable window is at least partly housed in the lower box, and an upper position in which the frame is hidden by the window, the window comprising an exterior face directed towards an exterior of the door, an interior face directed towards an interior of the door, and a peripheral edge, a part of the interior face completely covering the vertical post and part of the peripheral edge extending along the vertical post when the window is in the upper position;

a window guide fixed to the interior face of the window and extending along the part of the peripheral edge; and a slide, a part of which is fixed to the vertical post and can cooperate with the window guide to guide the window as the window moves, wherein the slide is formed in a single piece and comprises sealing lips and a fixing clamp on the vertical post, the clamp having an elongate shape along the vertical post and having a U-shaped cross-section, an opening of the U-shaped cross-section is oriented towards the interior of the door.

2. The door according to claim 1, wherein the slide comprises a housing which extends along the vertical post and which receives a part of the window guide, the housing being adjacent to the clamp.

3. The door according to claim 2, wherein the clamp comprises two parallel lateral walls which extend along the vertical post and a median wall which connects the lateral walls together and which is parallel to and facing the interior face of the window.

4. The door according to claim 3, wherein the housing is at least partly delimited by a first of said two parallel lateral walls and by an extension of said median wall which extends towards the window guide.

5. The door according to claim 4, wherein the extension extends parallel to the interior face of the window.

6. The door according to claim 4, wherein the extension comprises a free end opposite the first of the lateral walls, the free end comprising a rim which is oriented towards the interior of the door and which extends along the vertical post.

7. The door according to claim 4, wherein the extension and/or the median wall comprises a face facing the interior face of the window, which is coated with a flocking and/or a smooth or embossed coating.

8. The door according to claim 6, wherein the window guide rests on the rim in a direction perpendicular to the window and/or in a direction parallel to the window.

9. The door according to claim 4, wherein a second of said lateral walls comprises or is connected to at least one sealing lip of the sealing lips and/or at least one sealing tube of the sealing lips.

10. The door according to claim 1, wherein the clamp comprises a hook which is able to cooperate with a punched hole of the vertical post.

11. The door according to claim 1, wherein the slide further comprises a leg which extends along the vertical post and which is covered by the interior face of the window, the leg comprising one end connected to the clamp and an opposite end connected to the vertical post or to an interior trim which covers the vertical post.

12. The door according to claim 11, wherein the clamp comprises two parallel lateral walls which extend along the vertical post and a median wall which connects the lateral walls together and which is parallel to and facing the interior face of the window, and wherein the leg is connected to an end of one of the lateral walls of the clamp, which is opposite another end of the one of the lateral walls which is connected to the median wall.

13. The door according to claim 11, wherein the slide comprises a housing which extends along the vertical post and which receives a part of the window guide, the housing being adjacent to the clamp, and wherein the housing is at least partly delimited by said leg.

14. The door according to claim 11, wherein the leg comprises at least one sealing lip which cooperates with the interior face of the window and/or with the window guide, and/or with the vertical post, and/or with the interior trim which covers the vertical post.

15. The door according to claim 11, wherein the leg comprises a rim which is oriented towards the window and on which the window guide is able to bear in a direction parallel to the window.

16. The door according to claim 11, wherein the clamp is made of a harder material than the leg.

17. The door according to claim 1, wherein the clamp comprises an inner armature.

18. A vehicle comprising the door according to claim 1 and a centre pillar which extends along the vertical post when the door is closed, the exterior face of the window being aligned with an exterior face of an element adjacent to said part of the peripheral edge of the window.

19. The vehicle according to claim 18, wherein the element is an exterior trim or a fixed window which at least partially covers the centre pillar.

20. The vehicle according to claim 18, wherein the element is a window which forms part of another door of the vehicle.

* * * * *